United States Patent [19]
Corris et al.

[11] Patent Number: 4,558,183
[45] Date of Patent: Dec. 10, 1985

[54] OPTO-COUPLER INTERFACING CIRCUIT

[75] Inventors: C. James Corris, Shenandoah; Blaine E. Beck, Peachtree City, both of Ga.

[73] Assignee: Cellutron Corporation, Stamford, Conn.

[21] Appl. No.: 538,422

[22] Filed: Oct. 3, 1983

[51] Int. Cl.⁴ ............................................... H04M 3/22
[52] U.S. Cl. ................... 179/84 A; 179/81 R; 179/18 FA
[58] Field of Search ............... 179/84 A, 81 R, 84 R, 179/18 FA, 2 C, 170 NC, 2 DP, 2 EA; 455/602

[56] References Cited

U.S. PATENT DOCUMENTS

| | | | |
|---|---|---|---|
| 3,410,961 | 11/1968 | Slana | 179/18 FA |
| 3,848,094 | 11/1974 | Russell | 179/18 FA |
| 4,056,719 | 11/1977 | Waaben | 455/602 X |
| 4,093,830 | 6/1978 | Pappas | 179/84 A |
| 4,282,604 | 8/1981 | Jefferson | 455/602 |
| 4,287,392 | 9/1981 | Melindo | 179/16 AA |
| 4,313,225 | 1/1982 | Carbrey et al. | 455/602 |
| 4,495,383 | 1/1985 | Lubin | 179/100 L |

Primary Examiner—James L. Dwyer
Attorney, Agent, or Firm—Vorys, Sater, Seymour and Pease

[57] ABSTRACT

A circuit for interfacing a telephone system, such as a cordless telephone, to telephone lines by the use of opto-couplers, arranged to establish a telephone line loop upon detecting a ringing signal on the telephone lines. Preferably, three opto-couplers are used in varying combinations to provide a standby condition, ringing detection, ringing detection shut-off, telephone line loop connection, incoming audio, and outgoing audio functions. Such a circuit eliminates the use of transformers and relays, while meeting regulations.

20 Claims, 3 Drawing Figures

OPTO-COUPLER INTERFACING CIRCUIT

BACKGROUND OF THE INVENTION

This invention relates to an interfacing circuit for interfacing a telephone system, such as a cordless telephone, with telephone transmission lines. More particularly, this invention relates to such an interfacing circuit which uses optically-coupled transistorized elements rather than hybrid transformers and relay components. Still more particularly, this invention relates to an optically-coupled interfacing circuit of the type described having three optically-coupled elements, each having a light-emitting component and a light-responsive component, for providing DC line loop regulation, incoming audio, outgoing audio, ring detection, and pulse dialing.

In the art of coupling telephone systems to telephone lines, it has been a customary practice to use a hybrid transformer to balance the interfacing of the telephone with the telephone line. However, such a component is bulky and expensive and its associated relay often generates audible noise during the dialing pulse duty cycle. Thus, it is a problem to provide interfacing networks which meet regulatory specifications for voltage isolation, transient suppression, DC current maintenance regardless of loop length, and impedance requirements as are more specifically set forth in the regulations of the Federal Communications Commission, Part 68, while attempting to minimize the circuit size for use in miniaturized components specifically suited for portable use.

Such a problem has become increasingly apparent in developing cordless extension telephones in that the base unit for the cordless telephone requires transmitting and receiving circuits for transmitted connections between the base unit and the portable telephone. Thus, it is desirable to achieve the interfacing function, while meeting federal regulations, in the smallest amount of space consistent with compliance with the regulations to permit incorporation in the base unit of the component pertinent to the cordless telephone operation.

The art of interfacing telephone systems has in the past used opto-couplers. For example, U.S. Pat. No. 4,056,719 utilizes a pair of opto-couplers to achieve electrical isolation between input and output signals without the use of a traditional hybrid transformer. U.S. Pat. No. 3,410,961 also describes the use of an opto-coupler in a line circuit for connecting a subscriber line to a switching network wherein diodes of the optical coupler are connected with the subscriber line while the phototransistors are interconnected with the switching network. Still further, U.S. Pat. No. 3,848,094 discloses the use of an opto-electronic coupler in a telephone circuit in part for detecting off-hook, on-hook, dial, and hook-flash signals. There, the circuit is connected to provide a high impedance AC signal as opposed to DC, wherein the absence and presence of current flow through the direct current path is used to provide dialing signals.

However, such circuits have not incorporated such optical couplers in cordless telephones or in a combination which provides all of the traditional interfacing functions in an optically-coupled network. For example, it is an objective of this invention to provide such an interfacing circuit which provides DC line loop regulation, incoming audio, outgoing audio, line break, off-hook, on-hook, pulse dialing, ring detection, and incoming audio functions in a circuit which utilizes a minimum of components. Such circuit must also provide the appropriate ring equivalence number and a circuit for detecting a ringing signal on the telephone line to establish the telephone line loop. Once the loop is established, it is a problem in the development of such a circuit to provide audio signals from the telephone system to the coupled telephone lines, and to provide audio signals on the telephone lines to the receiver circuits in the telephone system. Moreover, such a network should be arranged to accommodate either dial pulsing or touch tone dialing capabilities for the telephone system thus coupled.

These and other objectives of the invention will become apparent from the written description of the invention which follows taken in connection with the accompanying drawings.

SUMMARY OF THE INVENTION

Directed to achieving the foregoing objectives of the invention and overcoming the problems of the prior art in incorporating optically-coupled circuits to telephone systems, this invention relates to an optically-coupled interfacing circuit for interfacing telephone transmission lines in a telephone system adapted to be connected to the telephone transmission lines. In a preferred embodiment, the interfacing circuit includes a first, a second, and a third opto-coupler, each including a light-emitting component and a light-responsive component. Means are provided for establishing a telephone line loop between the telephone unit and the telephone transmission lines upon detecting a ringing signal on the telephone lines. The telephone line loop establishing means includes means for actuating the light-emitting component of the second opto-coupler to connect the telephone lines to the loop and for actuating the light-emitting component of the first opto-coupler to provide a constant reference signal for the loop.

The circuit according to the invention utilizes the three opto-couplers in varying combinations to produce a multiplicity of functions for the interfacing circuit. For example, the first opto-coupler is used for DC line loop regulation and outgoing audio, while the first and the third opto-couplers are used for line break off-hook and on-hook indications, and pulse dialing. In this embodiment, the second opto-coupler is used for incoming audio and ring detection.

The circuit exhibits, in its standby condition, an infinite DC resistance and a predetermined AC impedance to the telephone line through resistive-capacitive networks in series with the parallel combination of an input bridge network connected to the incoming telephone lines and the light-emitting component of the second opto-coupler. The AC impedance thus presented to the incoming telephone lines determines the ring equivalence number. When the ring signal is present on the incoming telephone lines, current is provided to the light-emitting component in the second opto-coupler to provide a ring detection signal at an output of the transistor of the second opto-coupler. The ring detection signal is preferably a two-state signal, varying between a high level and a low level DC voltage. The application of high level signal from the telephone system to the interfacing circuit representing an off-hook condition, or an "answer" mode (whether automatic or manual), causes the ring detection signal to be shut off and to close the telephone line loop. Closing the telephone line loop thus interconnects the telehone unit to the telephone lines.

Circuit means are thus provided to close the telephone line loop by actuating the light-emitting components in the first and third opto-coupler. When the light-responsive component of the third opto-coupler is actuated, the telephone lines are connected through a diode bridge to a loop regulator circuit. Means are provided in the interfacer for producing a constant current thus to produce a constant voltage reference for the loop current regulator so that an audio signal developed at the interconnected telephone system will cause the signal developed across a voltage reference component to vary at that same audio rate. Thus, the audio signals generated at the telephone system are provided to the incoming telephone lines. Similarly, a portion of the loop current is utilized to actuate the light-emitting component in the second opto-coupler so that incoming audio signals appearing on the telephone lines are provided to the telephone system.

The interfacing circuit also includes means for accommodating dial pulsing or touch tone dialing provided at the telephone system and means to prevent transients without suppression of dial pulse amplitude. In a preferred embodiment, the light-responsive element of the third opto-coupler is an SCR.

These and other features of the invention will be described in greater detail hereinafter.

DETAILED DESCRIPTION OF THE PREFERRED EMBODIMENTS

Figure 1:
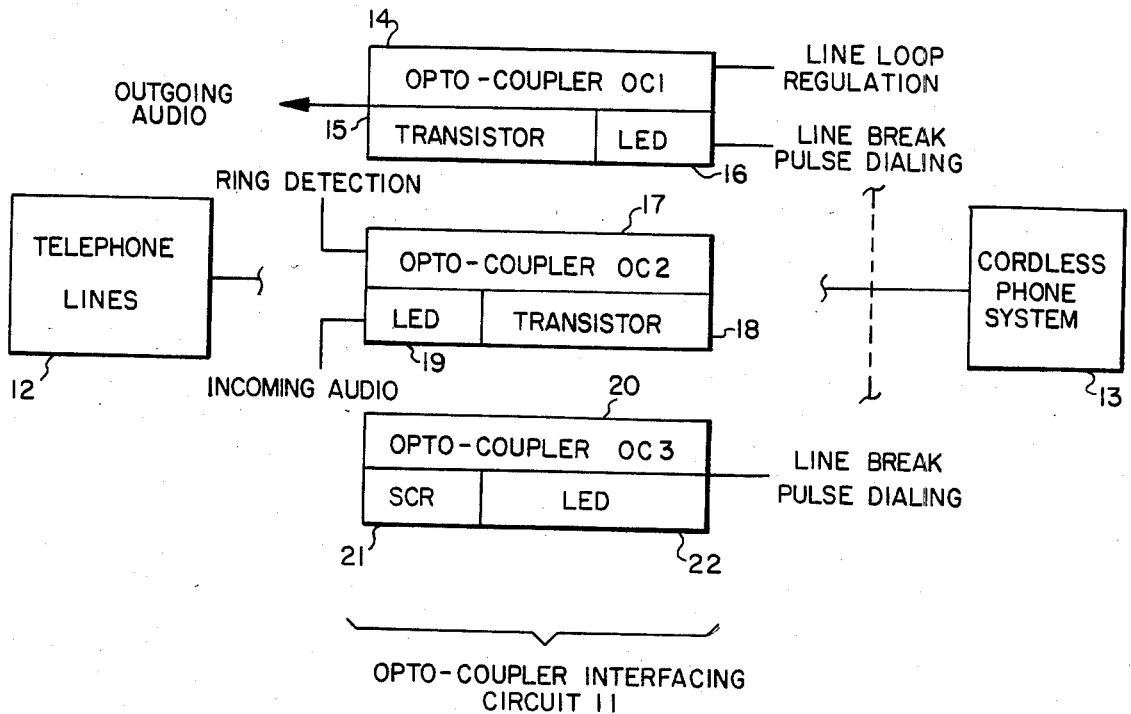
FIG. 1 is a functional block diagram of the opto-coupler interfacing circuit according to the invention interconnecting telephone lines and a cordless telephone and relating system components in the invention with their function in the interconnecting system.

In FIG. 1, the opto-coupler circuit as used and according to the invention is designated generally by the reference numeral 11 interconnecting telephone transmission lines 12 with a cordless telephone system 13 in a manner which provides the necessary functions to interface the cordless telephone system with the telephone line without the use of hybrid transformers or mechanical relays.

A cordless telephone system, as is known, generally includes a cordless telephone and a base unit interconnected with the incoming telehone transmission lines. The described invention primarily relates to the circuit for thus connecting the base unit to provide the conventional telephone functions for the base unit. The circuit, however, can be used in other telephone or intercommunication networks.

The opto-coupler interfacing circuit 11 according to the invention includes an opto-coupler 14 (or OC1) having a transistor 15 and an associated light-emitting diode (LED) 16; the opto-coupler 17 (or OC2) having a transistor 18 and an associated LED 19; and an opto-coupler 20 (or OC3) having a controlled transistor, for example, a silicon controlled rectifier (SCR) 21 and an associated LED 22. The opto-coupler 14 (OC1) has its transistor 15 connected on the telephone line side of the coupling circuit and its LED 16 connected to the telephone system side, while the opto-coupler 17 (OC2) has its LED 19 connected on the telephone line side and its transistor 18 connected on the telephone system side. Similarly to the opto-coupler 14 (OC1), the opto-coupler 20 (OC3) has its SCR 21 connected on the telephone line side and its LED 22 connected on the telephone system side.

The circuit is arranged to provide, in the standby condition, an infinite DC resistance and a controlled AC impedance to the incoming telephone line to which the telephone system is connected. The controlled AC impedance becomes the predominant factor in the determination of the ring equivalence number in compliance with telephone regulations. The circuit provides a ring detection signal through the use of the opto-coupler 17 (OC2) in response to the presence of a ringing signal on the telephone lines 12. A ring detection shut-off circuit representing the answering of the telephone or its transfer to an off-hook state, causes a regulated DC line loop in the opto-coupler circuit 11 to be closed. Thus, dial pulsing or DTMF dialing may be utilized with the circuit 11 upon closure of the DC telephone line loop for outgoing dialing. In addition, the closed line loop current is regulated, transient suppression is included, and overvoltage protection for the transistors in the loop is included, without suppression of the amplitude of the dial pulses. While the system is described in connection with a cordless telephone base unit as a preferred embodiment, the opto-coupler circuit may be utilized in any telephone system which must comply with Part 68 of the rules of the Federal Communications Commission for telephone interfacing and which require total electrical isolation, without the use of transformers and/or relays. The implementation of the general features thus discussed is described in connection with FIGS. 2 and 3.

As shown in the functional legends in FIG. 1, the opto-coupler 14 (OC1) is used in the coupling circuit for DC line loop regulation and outgoing audio from the connected telephone system to the telephone lines. The opto-couplers 14 and 20 (OC1 and OC3) are used for line break (or off-hook and on-hook circuit conditions) and for the pulse dialing functions. The opto-coupler 17 (OC2) is used in the circuit for ring detection and incoming audio signals. These functions are achieved by the functional interconnection and operation of these elements under various conditions as described in detail in connection with the wiring diagram in FIG. 3.

Figure 2:
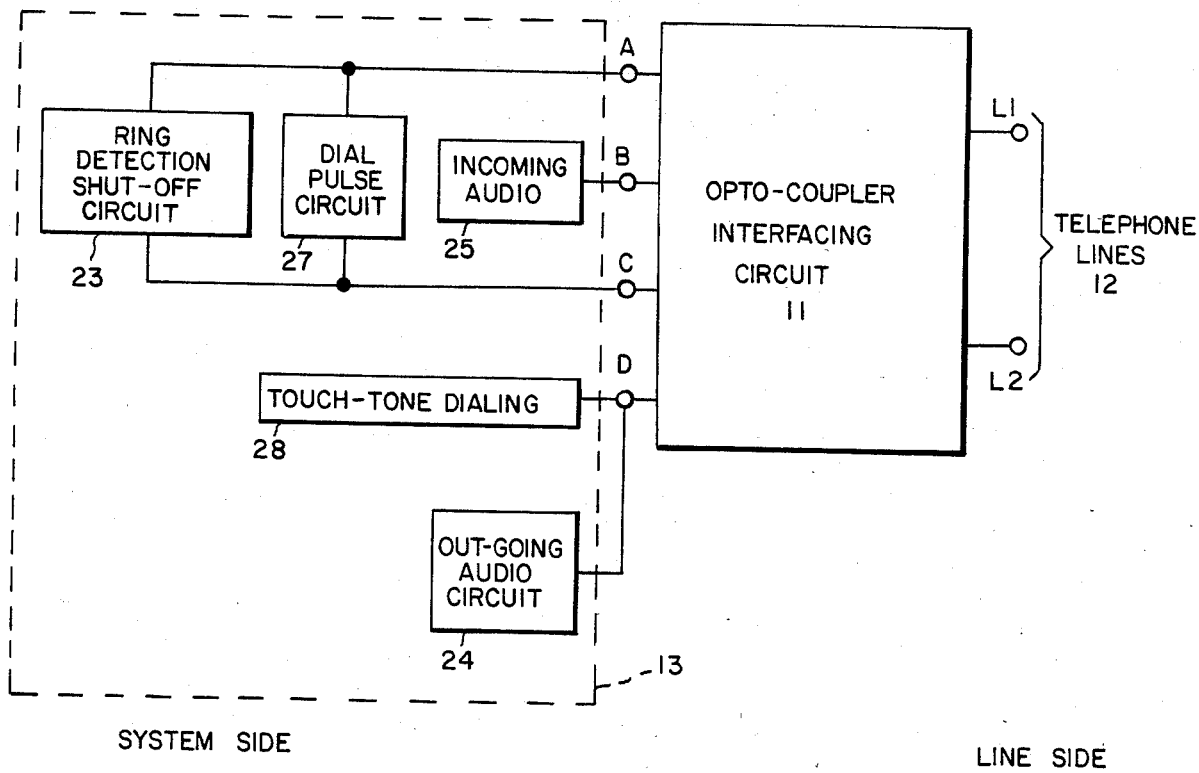
FIG. 2 is a block wiring diagram functionally interconnecting the telephone line with various external circuits through the opto-coupler interfacing circuit according to the invention.

FIG. 2 shows the basic wiring conditions of the opto-coupler circuit 11 according to the invention with four basic inputs on the telephone system side for connection of the opto-coupler circuit 11 and to the telephone lines L1 and L2, together comprising the conventional telephone lines 12. As mentioned above, the infinite DC resistance and controlled AC impedance, to be discussed later in greater detail, of the opto-coupler circuit 11 in its standby operation are seen by the telephone lines across lines L1 and L2. With the presence of an incoming ring signal across lines L1 and L2, a ring detection shut-off circuit connected across input terminals A and C causes the opto-coupler circuit 11, which generated the responsive ring detection signal in response to the incoming line, to shut that signal off and close the DC telephone line loop in a manner which will be described in connection with FIG. 3.

The audio input for transmisssion from the telephone system through the opto-coupler circuit 11 to the telephone lines, after connection, is provided to an input terminal D by an outgoing audio circuit 24. Conversely, the audio signals appearing across the lines L1 and L2 during the closed telephone line loop operation, are provided at an output terminal B of the coupling circuit 11 to an incoming audio circuit 25 which forms part of the cordless telephone system 13. Accordingly, incoming audio on the lines 12 is handled by the system 13 through the incoming audio circuit 25, while outgoing audio generated at the system 13 is handled through the outgoing audio circuit 24. Thus, when a closed telephone line loop is present, a user of the cordless telephone system 13 may communicate by the circuit 24 through the opto-coupler circuit 11 for transmission on the telephone lines L1 and L2, while the audio communications of the user at the remote end of the telephone line are communicated through the audio coupler circuit 11 for reception in the incoming audio circuit 25. The details of the cordless telephone system 13, with respect to its audio transmitting and receiving capabilities, is well known in the art and may assume a number of varying forms whose basic function is to permit two-way telephone communications in a conventional manner.

For outgoing calling, dial pulsing is provided to the input terminals A and C of the coupler circuit 11 by a dial pulsing circuit 27 which is part of the telephone system 13 and is well known in the art. Similarly, DTMF dialing is provided by a DTMF dialing circuit 28 connected to the input terminal D of the opto-coupler circuit 11. Similarly, the touch tone dialing circuit 28 is a part of the telephone system 13 and is well known in the art.

Figure 3:
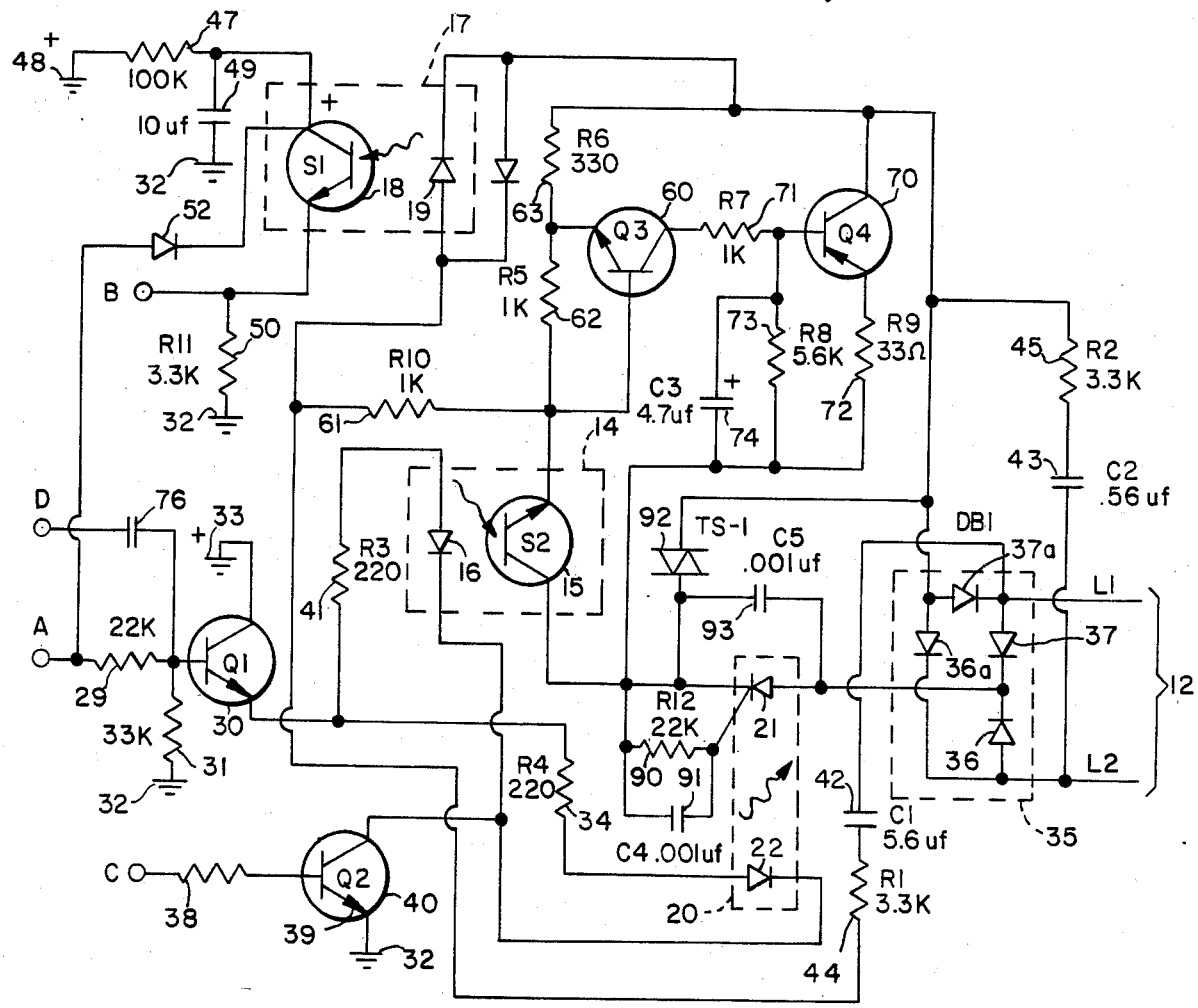
FIG. 3 is a detailed wiring diagram of the opto-coupler circuit according to the invention.

As shown in FIG. 3, the opto-coupler circuit 11 includes an input terminal A connected through a resistor 29 to the base of a transistor 30 (Q1) having its base connected through a biasing resistor 31 to a source of reference potential 32, such as ground. The collector of the transistor 30 is connected to a source of power 33, such as provided by a battery or other suitable source of positive potential.

The emitter of the transistor 30 (Q1) is connected through a coupling resistor 34 to the anode of the LED 22 forming a part of the opto-coupler circuit 20 (OC3). The anode of the controlled diode 21 (SCR) is connected to the commonly-connected cathodes of each of a pair of diodes 36, 37 forming part of a diode bridge 35 connected across the telephone lines L1 and L2 of the conventional telephone line system 12.

The input terminal C of the telephone system 13 is connected through a resistor 38 connected to the base of a transistor 40 (Q2) having its emitter 39 connected to a source of reference potential 32. The collector of the transistor 40 is connected to the cathode of the LED 16 of the opto-coupler circuit 14. The collector of the transistor 15 of the coupler circuit 14 is connected to the cathode of the controlled diode (SCR) 21. The anode of the LED 16 of the opto-coupler circuit 14 is connected through a resistor 41 to the emitter of the transistor 30 in circuit with the input terminal A. Thus, the standby condition for the interfacing circuit 11 can now be described.

During the standby condition, the transistors 30 and 40 (Q1, Q2) are in an off state and the coupling circuits 14 and 20 (OC1, OC3) are thus not driven. Since the SCR 21 in the coupling circuit 20 (OC3) is in an off state, the telephone lines L1 and L2 see an infinite DC resistance presented by the interfacing circuit 11. The telehone lines L1 and L2 also see an AC impedance formed by the combination of a capacitor 42, a capacitor 43, a resistor 44, and a resistor 45. As shown, the capacitor 42 and the resistor 44 are in series with the telephone line L1, while the capacitor 43 and the resistor 45 are in series with the telephone line L2. The capacitor 43 and the resistor 45 are connected in series with the LED 19 of the opto-coupler circuit 17 (OC2). Similarly, the capacitor 42 and the resistor 44 are connected in series with the anode of the LED 19 of the opto-coupler circuit 17 (OC2). The respective series combinations are in parallel with the diode bridge 35 and thus form the AC impedance presented to the telephone lines. As indicated, the AC impedance thus presented by this combination of elements in the standby condition for the opto-coupler circuit 11 to the incoming telephone lines 12 becomes the predominant factor in the determination of the ring equivalence number (REN) as specified in Part 68 of the Federal Communications Commission regulations.

The transistor 18 of the opto-coupler circuit 17 (OC2) has its collector connected through a resistor 47 to a source of positive potential 48 and through a capacitor 49 connected to a source of reference potential. The emitter of the transistor 18 of the opto-coupler circuit 17 is directly connected to the input terminal B of the circuit 11 and to a source of reference potential 32 through a resistor 50.

The ring detection function of the opto-coupler circuit 11 can now be described. With the circuit 11 in the standby condition wherein the incoming telephone lines L1 and L2 see an infinite DC resistance and an AC impedance formed by the combination of elements, including the LED 19, as described, a ringing signal is assumed to be presented across the incoming lines L1 and L2. The ringing signal is provided from the incoming line L1 through the capacitor 42 and resistor 44, or from the line L2 through the capacitor 43 and the resistor 45 to the LED 19 causing current to flow through the LED 19. Light emitted by the LED 19 causes the transistor 18 to turn on and become conductive, causing its collector to shift from a high level, for example, approximately 8 volts DC when biased as shown, to a low level, for example, 0.25 volts DC, to be used as a ring detection signal.

The collector of the transistor 18 is connected through a diode 52 to the input terminal A of the circuit 11. Thus, the high and low level signals present at that collector are thus also presented to the input terminal A. If a DC level of approximately 8 volts is applied to the input terminals A and C, such as by an answer condition of the telephone system, the ring detection signal thus generated by the opto-coupler circuit 17 will be shut off by driving the collector of the transistor 18 of a high level through the diode 52. By shutting off the ring detection signal, the telephone line loop can then be closed in a manner to be described to connect the telephone system with the telephone lines after detection of the ringing signal and a subsequent shutting off of the ringing signal.

The telephone line loop will be closed as follows. The transistor 30 in circuit with the input terminal A acts as an emitter follower and applies a fixed DC potential to the resistors 41 and 34 in series respectively with the LED 16 and the LED 22 of the opto-coupler circuits 14 and 20 respectively. When such a fixed DC potential is so applied to the respective LED 22, the SCR 21 in the opto-coupler circuit 20 turns on thus connecting the telephone lines L1 and L2 through the diode bridge 35 to a loop regulator circuit designated generally by the reference numeral 35 the operation of which will be described. At the same time, the transistor 15 in the opto-coupler circuit 14 is turned on by the light emitted by the diode 16 under these conditions, to act as a constant current source for the loop regulator circuit 35.

A major portion of the current in the transistor 15 of the coupler circuit 14 is provided to the base of a transistor 60 which is also connected through a resistor 61 to the anode of the LED 19 and through a resistor 62 to its emitter. The current thus provided under these conditions to the base of the transistor 60 causes it to turn on. The remaining current from the transistor 15, under these conditions, is provided at its emitter through the resistor 62 to the resistor 63 connected to the junction between the emitter of the transistor 60 and the resistor 62, the other end of which is connected to the cathode of the LED 19 and to the series combination of the resistor 45 and the capacitor 43 connected to line L2. The remaining current produced by the transister 15 at its emitter is provided through the transistor 61 and thus to the LED 19 of the opto-coupler circuit 17 (OC2).

The constant current thus flowing through the resistor 63 provides a constant voltage reference for the loop current regulator circuit 35.

The loop current regulator circuit 35 includes a transistor 70 having its base connected through a resistor 71 to the collector of the transistor 60, its collector directly connected to the junction between the resistor 45 and the LED 19, (having its voltage level set by the resistor 63 as described) and its emitter connected through a resistor 72 to the junction between the collector of the transistor 15 and the cathode of the SCR 21 of the opto-coupler circuit 20 (OC3). The base of the transistor 70 is also connected by way of a parallel combination of a resistor 73 and a capacitor 74 to that same junction. The resistors 71, 73, 72, and the capacitor 74 thus provide DC bias paths for the transistor 70 acting as a loop current regulator. Thus, when an outgoing audio voltage is provided from the telephone system 13 to the input terminal D of the circuit 11 through a coupling capacitor 76 to the transistor 30, the voltage reference developed across the transistor 63 for the condition thus described will vary at that same audio rate. The voltage reference developed across the resistor 63 thus causes the transistor 70 to impress that same audio signal across the telephone lines L1 and L2.

In a similar manner, since a portion of the loop current also passes through the LED 19 of the opto-coupler circuit 17 (OC2), the incoming audio signals appearing on the telephone lines L1 and L2 also appear at the terminal B across the resistor 50. Thus, a closed loop is established between the incoming audio circuit 25 of the system at point B, as described in connection with FIG. 2, and the outgoing audio circuit 24 provided at the input terminal D, also as described in connection with FIG. 2.

With the circuit as thus described, dial pulsing provided by the dial pulsing circuit 27 as a part of the telehone system 13 which is thus connected to the terminals A and C to turn off either of the transistors 30 or 40 at the dial pulse rate and cause the circuit to access the telephone lines L1 and L2 in a conventional manner. Similarly, DTMF dialing from a DTMF dialing circuit 28 connected to the input terminal D causes the connection of the telephone system to the telephone line.

Transient suppression for the SCR 21 in the opto-coupler circuit 20 is provided through a parallel combination of a resistor 90 and a capacitor 91. A transient suppressor, comprising the combination of a pair of oppositely poled diodes 92 is connected between the common connection between the collector of the transistor 70 and the common anode connection of the diodes 36a and 37a of the diode bridge 35 and through a capacitor 93 to the common cathode connection between the diodes 36 and 37 of the diode bridge 35. Thus, overvoltage protection is provided by the transient suppressor 92 for the transistors inside the loop. On the other hand, since the SCR 21 in the opto-coupler circuit 20 is switched off with the dial pulses, there is no suppression of the dial pulse amplitude.

Representative component values for the preferred embodiment are as follows, where resistance is in ohms and capacitance is in micro-farads:

Resistor 29: 22K
Resistor 31: 33K
Resistors 34, 41: 220
Capacitors 42, 43: 0.56
Resistors 44, 45: 3.3K
Resistor 47: 100K
Capacitor 49: 10
Resistor 50: 3.3K
Resistors 61, 62: 1K
Resistor 63: 330
Resistor 71: 1K
Resistor 72: 33
Resistor 73: 5.6K
Capacitor 74: 4.7
Resistor 90: 22K
Capacitors 91, 93: 0.001

The invention has thus been described in terms of a preferred embodiment, but modifications are possible without departing from the spirit of the invention.

What is claimed is:

1. In a system of the type which comprises telephone transmission lines and a telephone system adapted to be connected to the telephone transmission lines, the improvement comprising optically-coupled interfacing means for interfacing said telephone system and said telephone lines, said interfacing means comprising:
   a first opto-coupler, a second opto-coupler, and a third opto-coupler, each including a light-emitting component and a light-responsive component;
   means for establishing a telephone line loop upon detecting a ringing signal on said telephone lines, said telephone line loop establishing means actuating said light-emitting component of said third opto-coupler to connect said telephone lines to said telephone line loop and for actuating the light-emitting component of said first opto-coupler to provide a constant reference signal for said loop;
   means in said telephone system for providing an audio signal to said interfacing means for applying said audio signal through said interfacing means to said telephone lines when said telephone loop is established; and
   means responsive to the current in said telephone loop when established for actuating the light-emitting component in said second opto-coupler so that said audio signals applied to said interfacing means are outputted from said interfacing means.

2. The system as set forth in claim 1, wherein said system includes transistor drive means in circuit with said first and said third opto-coupler when said interfacing means is in a standby condition.

3. The interfacing means according to claim 2, wherein, when said interfacing means is in said standby condition, the telephone line is provided with an infinite DC resistance and a predetermined AC impedance, the latter of which establishes the ring equivalence number.

4. The system as set forth in claim 3, wherein said AC impedance comprises a resistive-capacitive circuit in circuit with the light-emitting component of said second opto-coupler.

5. The system as set forth in claim 3, wherein said AC impedance comprises a first capacitor in series with a first resistor, a second capacitor in series with a second resistor, the series combination of the first capacitor and first resistor being in circuit with the light-emitting component of said second opto-coupler and connected to one of said telephone lines, the other of said telephone lines being connected to the series combination of the second resistor and second capacitor which is also in circuit with the light-emitting component of said second opto-coupler.

6. The system as set forth in claim 5, further including a diode bridge connected across said incoming telephone lines, said resistive-capacitive circuits being in series with the parallel combination of the light-emitting component in the second opto-coupler and the diode bridge.

7. The system as set forth in claim 1, further including means for detecting said ring signal, said ring detecting means including the light-emitting component in said second opto-coupler.

8. The system as set forth in claim 7, further including a resistor responsive to actuation of said light-emitting component of said second opto-coupler to provide an output signal which is variable between two discrete levels, thereby to act as a ring detection signal.

9. The system as set forth in claim 8, further including means to shut-off said ring detection signal by driving the collector of the second opto-coupler to its high level thereby to close the telephone line loop.

10. The system as set forth in claim 1, further including a first input transistor and a second input transistor for applying a fixed DC potential to the light-emitting components in said first and third opto-couplers respectively.

11. The system as set forth in claim 1, further including a loop regulator circuit, the transistor of said first opto-coupler acting as a constant current source for establishing a constant voltage reference for the loop current regulator circuit.

12. The circuit as set forth in claim 11, wherein said loop current regulator circuit includes a transistor having its output connected across a resistor connected with the output of the light-responsive component of said first opto-coupler.

13. The circuit as set forth in claim 12, wherein an audio voltage signal applied to said interfacing circuit causes the reference signal developed across said resistor to vary at that audio rate causing the loop current regulator to impress that audio signal across the telephone lines thereby to couple the audio signal to the telephone lines.

14. The circuit as set forth in claim 13, wherein the audio signals on the telephone lines are provided to an output of the light responsive component of the second opto-coupler when said loop regulator circuit is established.

15. The circuit as set forth in claim 14, further including diode pulsing means in said telephone system which are connected to said first and said second input transistor to provide dialing at the dial pulse rate.

16. The circuit as set forth in claim 14, further including a DTMF dialing network of said telephone system is applied to the first input transistor.

17. The system as set forth in claim 1, further including means for preventing transients from actuating the light-responsive element of said third opto-coupler means.

18. The system as set forth in claim 1, wherein said light-responsive component of said third opto-coupler is an SCR.

19. The system as set forth in claim 1, further including transient suppression means to provide over voltage protection for resistors in said telephone loop with suppression of dial pulse amplitude established by said ringing signal.

20. In a system of the type which comprises telephone transmission lines and a telephone system adapted to be connected to the telephone transmission lines, the improvement comprising optically-coupled interfacing means for interfacing said telephone system and said telephone lines, said interfacing means comprising:
  means for establishing a regulated telephone line loop between said telephone system and said telephone lines upon detecting a ringing signal on said telephone lines;
  incoming audio means for connecting audio signals on said telephone lines to said telephone system when said telephone line loop is established; and
  outgoing audio means for connecting audio signals from said telehone system to said telephone lines when said telephone line loop is established,
  each of said telephone line loop establishing means, said incoming audio means, and said outgoing audio means comprising at least one of a plurality of opto-couplers in said interfacing means, without a transformer or relay.

* * * * *